(12) United States Patent
Goldin et al.

(10) Patent No.: US 7,742,410 B1
(45) Date of Patent: Jun. 22, 2010

(54) METHODS AND APPARATUS FOR USING GAP PACKETS TO CREATE A BANDWIDTH BUFFER OVER WHICH PACKETS CAN BE SENT TO REDUCE OR ELIMINATE OVERFLOW CONDITIONS

(75) Inventors: Leonid Goldin, Nepean (CA); Michael Lewis Takefman, Ottawa (CA)

(73) Assignee: Cisco Technology, Inc., San Jose, CA (US)

( * ) Notice: Subject to any disclaimer, the term of this patent is extended or adjusted under 35 U.S.C. 154(b) by 1757 days.

(21) Appl. No.: 10/320,170

(22) Filed: Dec. 16, 2002

(51) Int. Cl.
*G08C 15/00* (2006.01)
*H04L 12/28* (2006.01)
(52) U.S. Cl. .................. 370/230.1; 370/412; 370/419
(58) Field of Classification Search .............. 2/69, 2/77, 79, 85, 105, 106, 115, 171, 184, 227, 2/244, 246, 279, 175.3, 209.13, 1; 112/400, 112/401, 402; 40/329, 586; 370/229–232, 370/235, 289, 391, 389, 412, 413, 415, 517, 370/419
See application file for complete search history.

(56) References Cited

U.S. PATENT DOCUMENTS

| 5,974,997 | A | 11/1999 | Amburgey | |
|---|---|---|---|---|
| 6,091,709 | A | 7/2000 | Harrision et al. | |
| 6,226,290 | B1 * | 5/2001 | Salett et al. | 370/389 |
| 6,233,250 | B1 * | 5/2001 | Liu et al. | 370/469 |
| 6,944,154 | B2 * | 9/2005 | Coupe et al. | 370/389 |
| 6,952,738 | B1 * | 10/2005 | Gaudet | 709/231 |
| 6,980,567 | B1 * | 12/2005 | Markevitch et al. | 370/474 |
| 7,020,143 | B2 * | 3/2006 | Zdan | 370/395.21 |
| 7,095,737 | B2 * | 8/2006 | Lo | 370/389 |
| 2001/0014104 | A1 * | 8/2001 | Bottorff et al. | 370/471 |
| 2003/0002516 | A1 * | 1/2003 | Boock et al. | 370/412 |
| 2003/0161307 | A1 * | 8/2003 | Lo | 370/389 |

OTHER PUBLICATIONS

D. Tsiang and G. Suwala, "The Cisco SRP MAC Layer Protocol," RFC 2892, Aug. 2000, 52 pages.

* cited by examiner

*Primary Examiner*—Aung S Moe
*Assistant Examiner*—Kerri M Rose
(74) *Attorney, Agent, or Firm*—The Law Office of Kirk D. Williams

(57) ABSTRACT

Methods and apparatus are disclosed for using gap packets to create a bandwidth buffer over which packets can be sent to reduce or eliminate overflow conditions. One implementation sends a series of packets from a first device to a second device, the series of packets including interspersed information packets and gap packets. The first device determines when to insert the gap packets into the series of packets, and the gap packets received by the second device are dropped. The determination of when to insert one of the gap packets into the series of packets may be based on an occupancy level of a buffer, such as, but not limited to comparing it to a predetermined or variable threshold value. Also, the rate of sending gap packets and/or the size of the gap packets may be varied to adjust the size of bandwidth buffer created by the gap packets.

19 Claims, 8 Drawing Sheets

METHODS AND APPARATUS FOR USING GAP PACKETS TO CREATE A BANDWIDTH BUFFER OVER WHICH PACKETS CAN BE SENT TO REDUCE OR ELIMINATE OVERFLOW CONDITIONS

FIELD OF THE INVENTION

This invention especially relates to communications and computer systems; and more particularly, the invention relates to methods and apparatus for using gap packets to create a bandwidth buffer over which packets can be sent to reduce or eliminate overflow conditions.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (1P).

Spatial Reuse Protocol (SRP) is one type of networking protocol for communicating packet traffic over a bi-directional ring, and provides a technique for more efficient ring usage as compared to regular packet over SONET. SRP is described in "The Cisco SRP MAC Layer Protocol," RFC 2892, IETF (August 2000), which is hereby incorporated by reference. Using SRP, only traffic which is destine for the current node is processed by its layer 3 and up protocol processing mechanisms. All other traffic transits further on the ring until it reaches its destination. Because the each node needs to be able to insert its own traffic on the ring, each node includes a transit buffer (TB) which holds transit traffic (e.g., those packets received which are not destined for itself) for a short duration, allowing a node to insert traffic on the ring. SRP provides fair distribution of low priority traffic; however the high priority traffic is not controlled by fairness algorithm. This means that a high priority transit buffer can be overflowed. For example, if the previous node sends one hundred percent high priority traffic which is transit for current node and the media speed of previous node is higher than a speed of a current node. For example, the speed of a SONET link may vary of +/−20 ppm. If the a node is transmitting out a −20 ppm link and is receiving one hundred percent high priority traffic from a previous node at a rate of +20 ppm, then the high priority transit buffer fills at a rate of +40 ppm of the SONET clock and eventually the buffer will overflow.

A known prior attempt at solving this overflow problem was to periodically stall or stop traffic from being taken from the transit buffer of a node that sent traffic over a faster link. In this manner, a time gap was induced by the transit buffer circuitry. However, buffering is typically used by the link transmission components, which removed or reduced such time gap, and thus, the overflow condition still could be created. New methods and apparatus are desired which may reduce or eliminate the overflow condition.

SUMMARY OF THE INVENTION

Methods and apparatus are disclosed for using gap packets to create a bandwidth buffer over which packets can be sent to reduce or eliminate overflow conditions, such as that which may be created when communicating information between nodes of a network, between components in a computer or communications system, or between any two devices or other mechanisms. One embodiment sends a series of packets from a first device to a second device, the series of packets including interspersed information packets and gap packets. The first device determines when to insert the gap packets into the series of packets, and the gap packets received by the second device are dropped. In one embodiment, the determination of when to insert one of the gap packets into the series of packets is based on an occupancy level of a buffer, such as, but not limited to comparing it to a predetermined or variable threshold value. In one embodiment, the rate of sending gap packets and/or the size of the gap packets may be varied to adjust the size of bandwidth buffer created by the gap packets.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1A:
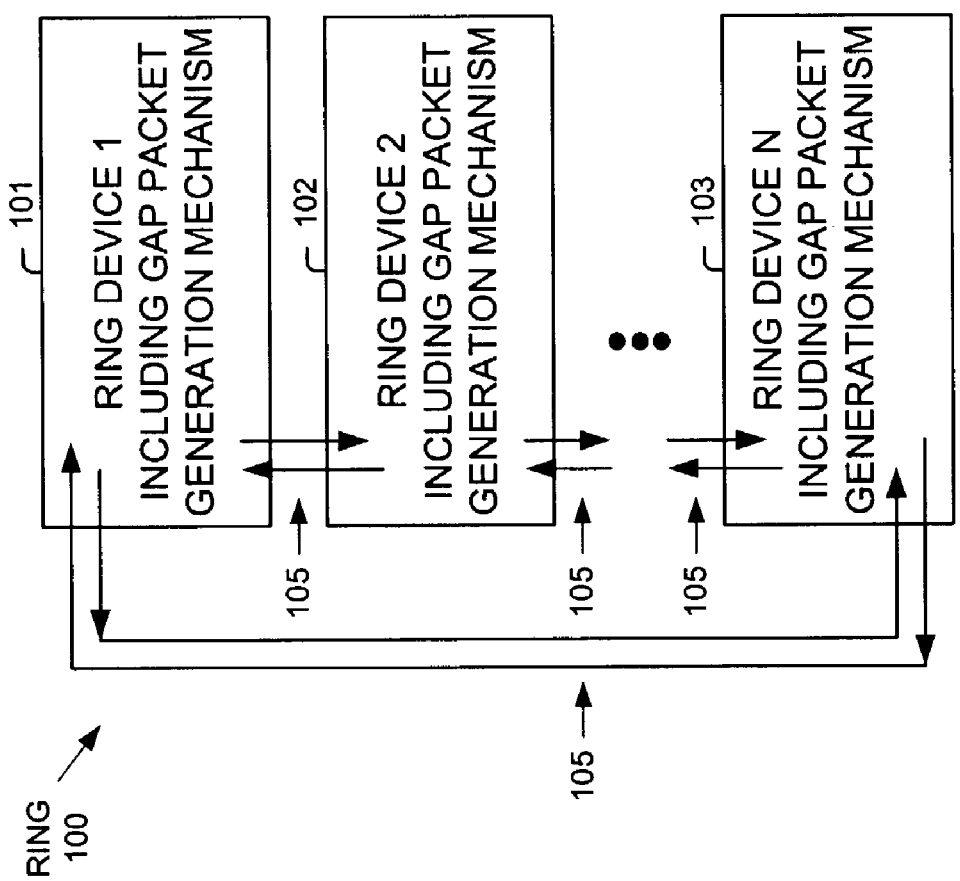
FIG. 1A is a block diagram of a ring of devices including a gap packet generation mechanism.

Methods and apparatus are disclosed for using gap packets to create a bandwidth buffer over which packets can be sent to reduce or eliminate overflow conditions, such as that which may be created when communicating information between nodes of a network, between components in a computer or communications system, or between any two devices or other mechanisms. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used herein to refer to a packet or any other unit or piece of information or data. The phrases "processing a packet" and "packet processing" typically refer to performing some steps or actions based on the packet contents (e.g., packet header or other fields), and such steps or action may or may not include modifying and/or forwarding the packet.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may be performed in the same or in a different serial or parallel ordering and/or by different components and/or processes, threads, etc., and/or over different connections and be combined with other functions in other embodiments in keeping within the scope and spirit of the invention. Furthermore, the term "identify" is used generically to describe any manner or mechanism for directly or indirectly ascertaining something, which may include, but is not limited to receiving, retrieving from memory, determining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, &cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular item rather than just one (e.g., the use of the word "memory" typically refers to one or more memories without having to specify "memory or memories," or "one or more memories" or "at least one memory", etc.) Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. Moreover, the term "or" is used herein to identify a selection of one or more, including all, of the conjunctive items.

Methods and apparatus are disclosed for using gap packets to create a bandwidth buffer over which packets can be sent to reduce or eliminate overflow conditions, such as that which may be created when communicating information between nodes of a network, between components in a computer or communications system, or between any two devices or other mechanisms. One embodiment sends a series of packets from a first device to a second device, the series of packets including interspersed information packets and gap packets. The first device determines when to insert the gap packets into the series of packets, and the gap packets received by the second device are dropped such that not all of the traffic received by a node goes into the transit buffer. In one embodiment, the determination of when to insert one of the gap packets into the series of packets is based on an occupancy level of a buffer, such as, but not limited to comparing it to a predetermined or variable threshold value. In one embodiment, the rate of sending gap packets and/or the size of the gap packets may be varied to adjust the size of bandwidth buffer created by the gap packets.

Figure 1B:
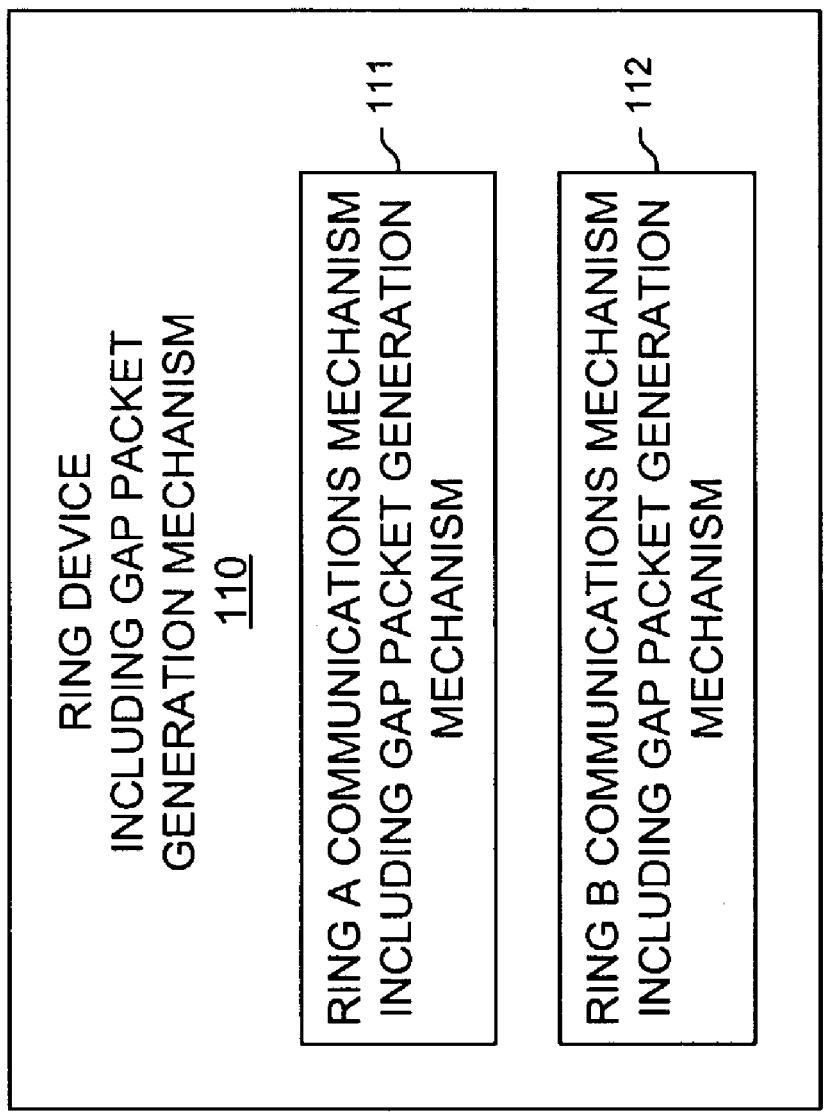
FIG. 1B is a block diagram of a ring device including a gap packet generation mechanism.

FIG. 1A illustrates an exemplary system including a ring 100 of devices 101-103, each including a gap packet generation mechanism. As shown, devices 101-103 are interconnected by links 105. FIG. 1B further illustrates a ring device 110, which may correspond to one or more of ring devices 101-103 (FIG. 1A), which includes a ring A communications mechanism 111 including a gap generation mechanism, and a ring B communications mechanism 112 including a gap generation mechanism.

Figure 1C:
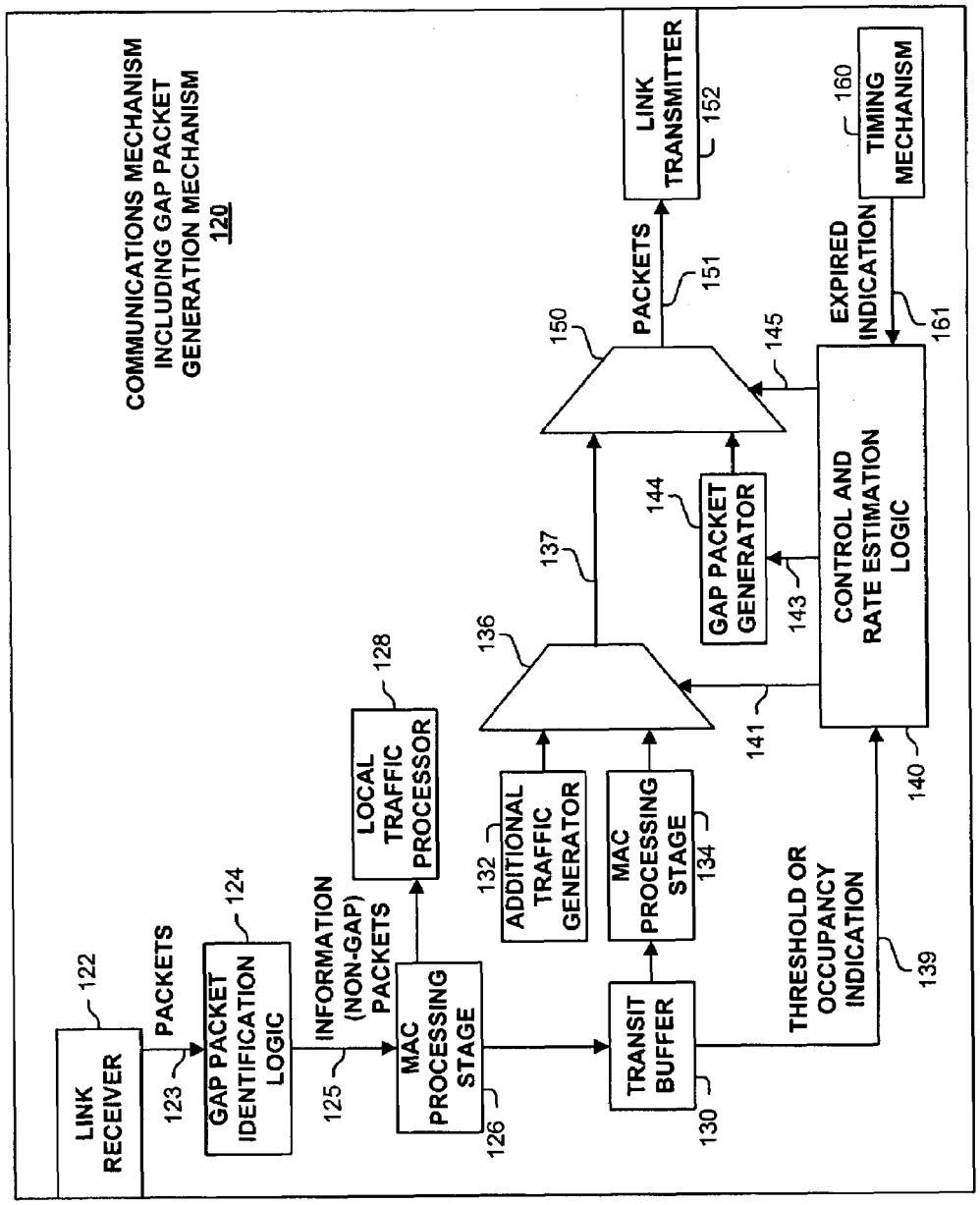
FIG. 1C is a block diagram of one embodiment of a communications mechanism including a gap packet generation mechanism.

FIG. 1C illustrates a communications mechanism 120, which may correspond to communications mechanisms 111-112 (FIG. 1B). In one embodiment, communications mechanism 120 includes a link receiver 122, which receives packets which are communicated over link 123 to gap packet identification logic 124.

Figure 2:
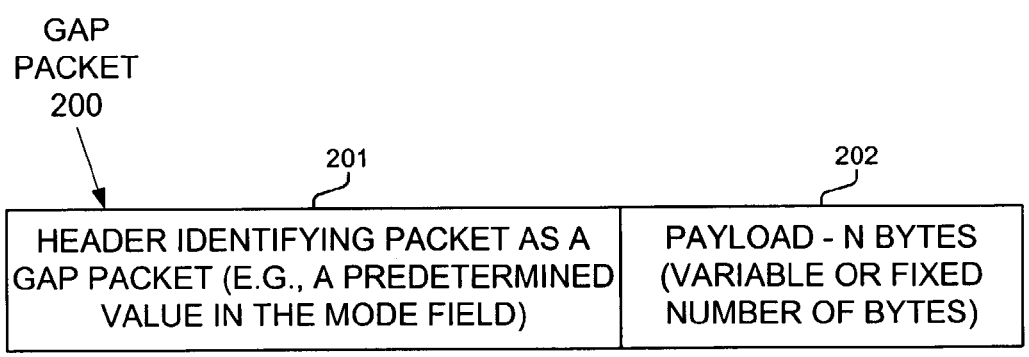
FIG. 2 is a block diagram of a gap packet used in one embodiment.

Turning to FIG. 2, illustrated is an exemplary gap packet 200 used in one embodiment. As shown, gap packet 200 includes a header field 201 and a payload or data field 202. Header 201 typically identifies whether or not the packet is a gap packet. In one embodiment, each gap packet includes a predetermined value, such as in a mode or other field of header 201, while other packets (e.g., information packets) do not include this value. Payload or data field 202 typically includes some number of bytes, with this number of bytes either being fixed or variable. The size of the bandwidth buffer is typically determined by the size of the gap packets and the rate at which they are sent.

Returning to FIG. 1C, gap packet identification logic 124 determines if a received packet is a gap packet, and if so, the received gap packet is dropped. Otherwise, the non-gap packets (e.g., information packets) are communicated over link 125 to a medium access control (MAC) processing stage 126, which identifies whether a packet is to be processed locally or forwarded to a next node. If the received information packet is to be processed locally, it is communicated to local traffic processor 128. Otherwise, the received information packet is placed in transit buffer 130.

Multiplexer or selector 136, based on signal 141 from control and rate estimation logic 140, is used to select packets from additional traffic generator 132, and MAC processing stage 134, which retrieves packets from transit buffer 130. In this manner, transit traffic and locally generated traffic can be interspersed according to some scheduling algorithm. Additionally, control and rate estimation logic 140 controls the interspersing of gap packets within the series of packets generated/sent from communications mechanism including gap packet generation mechanism 120. Multiplexer or selector 150, based on signal 145 from control and rate estimation logic 140, is used to select packets from selector 136 over link 137 or gap packets generated by gap packet generator 144, to produce the series of interspersed gap and information packets which is communicated over link 151 to link transmitter 152 for sending to a next node, device, or component, etc.

In one embodiment, timing mechanism 160 periodically generates a timer expired indication signal, which is communicated over link 161 to control and rate estimation logic 140. In response, control and rate estimation logic 140 determines whether or not to generate a gap packet, and possibly the size of the gap packet to be sent. If a gap packet is determined to be sent, then gap packet generator 144 receives such an indication over link 143 and multiplexor or selector 150 is adjusted accordingly. Moreover, in one embodiment, control and rate estimation logic 140 determines or receives over link 139 an indication of the occupancy level of transit buffer 130 and/or whether this occupancy level currently exceeds a predetermined or variable threshold amount.

Control and rate estimation logic 140 can adjust the bandwidth buffer created by the gap packets using a variety of techniques. In one embodiment, the size of the gap packet is adjusted. In one embodiment, the rate at which gap packets are sent is increased (such as by adjusting timing mechanism 160.) In one embodiment, both the size of gap packets and the rate at which they are sent are adjusted. Moreover, in one embodiment, the difference between the incoming and outgoing link rates is measured, with this measurement used to determine the gap packet traffic bandwidth (e.g., rate and size of gap packets) required to compensate for this difference in link rates.

Figure 1D:
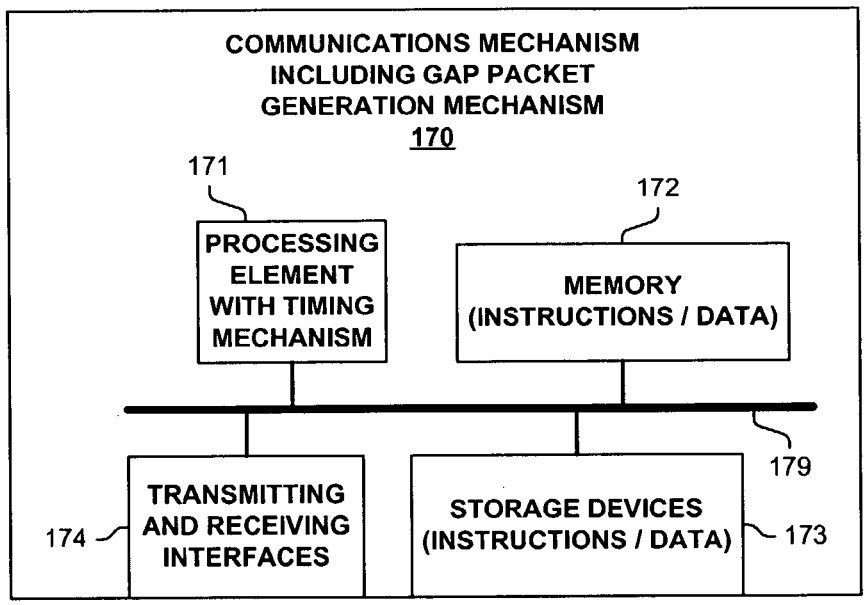
FIG. 1D is a block diagram of one embodiment of a communications mechanism including a gap packet generation mechanism.

FIG. 1D is a block diagram of one embodiment of a communications mechanism including a gap packet generation mechanism 170. In one embodiment, communications mechanism including a gap packet generation mechanism 170 includes a processing element with timing mechanism 171, memory 172, storage devices 173, and transmitting and receiving interfaces 174 for communicating with other entities (e.g., nodes, components, devices, etc.), which are typically coupled via one or more communications mechanisms 179 (shown as a bus for illustrative purposes). Various embodiments of communications mechanism including a gap packet generation mechanism 170 may include more or less elements. The operation of communications mechanism including a gap packet generation mechanism 170 is typically controlled by processing element 171 using memory 172 and storage devices 173 to perform one or more tasks or processes. Memory 172 is one type of computer-readable medium, and typically comprises random access memory (RAM), read only memory (ROM), flash memory, integrated circuits, and/or other memory components. Memory 172 typically stores computer-executable instructions to be executed by processing element 171 and/or data which is manipulated by processing element 171 for implementing functionality in accordance with the invention. Storage devices 173 are another type of computer-readable medium, and typically comprise solid state storage media, disk drives, diskettes, networked services, tape drives, and other storage devices. Storage devices 173 typically store computer-executable instructions to be executed by processing element 171 and/or data which is manipulated by processing element 171 for implementing functionality in accordance with the invention.

Figure 3A:
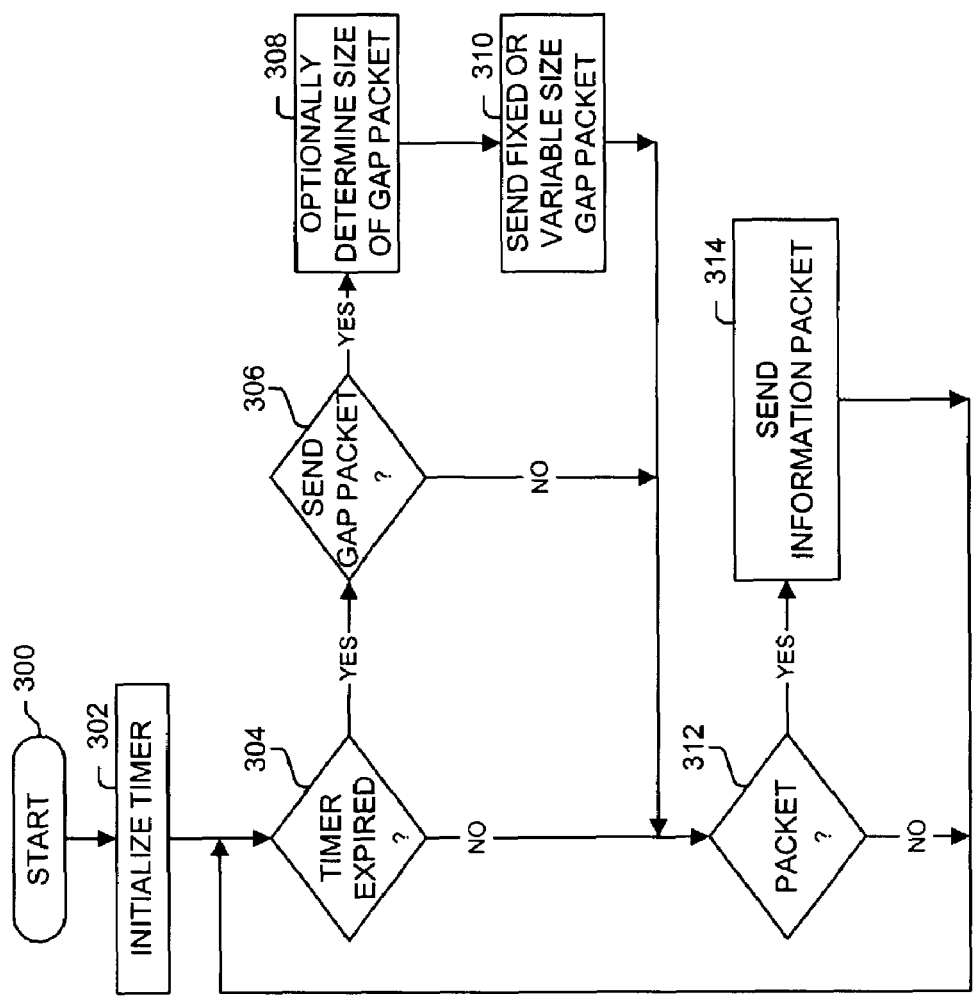
FIGS. 3A-C are flow diagrams illustrating a few of an unlimited number of processes that can be used in determining when to generate a gap packet.
Figure 3B:
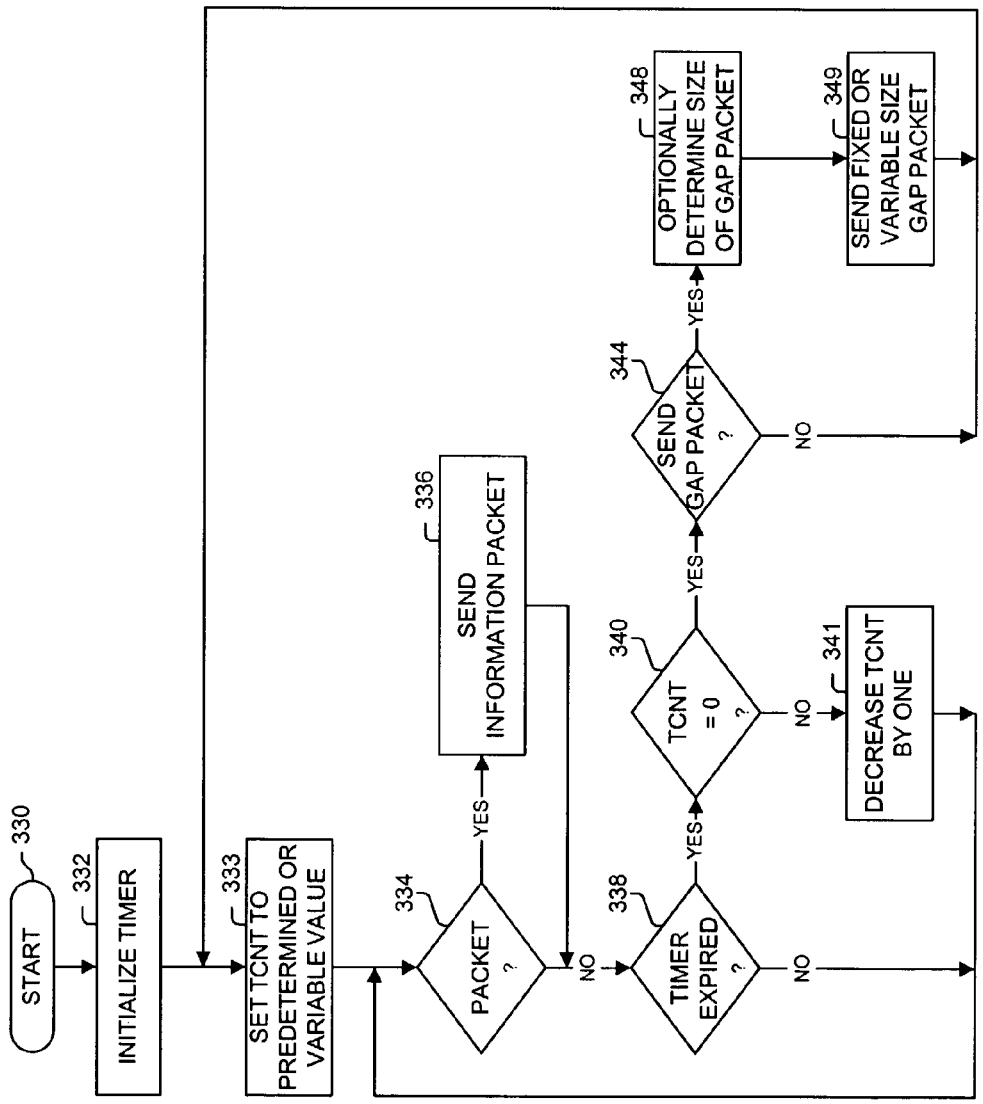
Figure 3C:
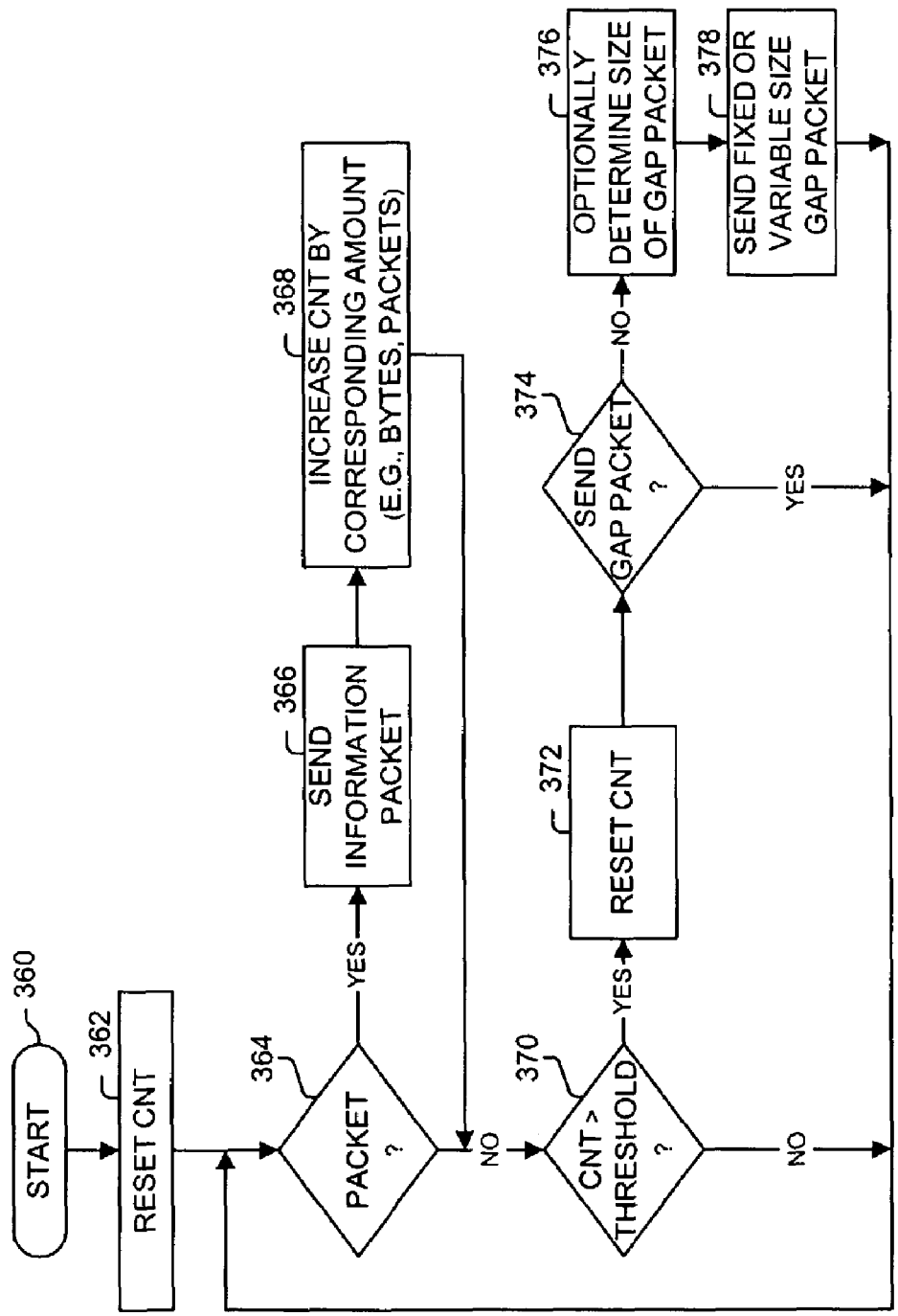

FIGS. 3A-C are flow diagrams illustrating a few of an unlimited number of processes that can be used in determining when to generate a gap packet. Turning to FIG. 3A, illustrated is a process used in one embodiment for generating a series of packets including interspersed information and gap packets. Processing begins with process block 300, and proceeds to process block 302, wherein a periodic timer is initialized. As determined in process block 304, if the timer has expired, then as determined in process block 306, if a gap packet is to be sent (e.g., the occupancy of the transit buffer equals or exceeds a predetermined or variable threshold value), then in process block 308, optionally, the size of the gap packet to send is determined. In process block 310, the fixed or variable size gap packet is sent. Processing proceeds to process block 312. As determined in process block 312, if an information packet is available to be sent, then in process block 314, the information packet is sent. Processing returns to process block 304.

FIG. 3B illustrates a process used in one embodiment for generating a series of packets including interspersed information and gap packets. This process uses a periodic timer as well as a timer count (TCNT) such that a gap packet is sent only after TCNT number of timer expirations. Processing begins with process block 330, and proceeds to process block 332 wherein a periodic timer is initialized. Next, in process block 333, the value of TCNT is set to a predetermined or variable value (e.g., it can be adjusted based on traffic levels and/or link speed differences, etc.) Next, as determined in process block 334, if an information packet is available to be sent, then in process block 336, the information packet is sent. Next, as determined in process block 338, if the timer has expired, then as determined in process block 340, if TCNT is not zero (e.g., the timer has not expired TCNT times), then TCNT is reduced by one in process block 341. Processing proceeds from process blocks 338 and 341 to process block 334.

Otherwise, as determined in process block 344, if a gap packet is to be sent (e.g., the occupancy of the transit buffer equals or exceeds a predetermined or variable threshold value), then in process block 348, optionally, the size of the gap packet to send is determined. In process block 349, the fixed or variable size gap packet is sent. Processing proceeds to process block 333.

FIG. 3C illustrates a process used in one embodiment for generating a series of packets including interspersed information and gap packets. This process checks whether to send a gap packet after a packet count (CNT) number of packets or bytes of information have been sent, such as instead or in addition to using a timer. Processing begins with process block 360, and proceeds to process block 362, wherein the value of CNT is set to zero. As determined in process block 364, if an information packet is available to be sent, then in process block 366, the information packet is sent, and in process block 368, CNT is increased by a corresponding amount (e.g., by one for one packet being sent, or by n for an n-byte packet being sent, etc.) Processing then proceeds to process block 370.

As determined in process block 370, if the value of CNT exceeds a threshold value, then in process block 372 CNT is set to zero. As determined in process block 374, if a gap packet is to be sent (e.g., the occupancy of the transit buffer equals or exceeds a predetermined or variable threshold value), then in process block 376, optionally, the size of the gap packet to send is determined. In process block 378, the fixed or variable size gap packet is sent. Processing proceeds to process block 364.

Figure 4:
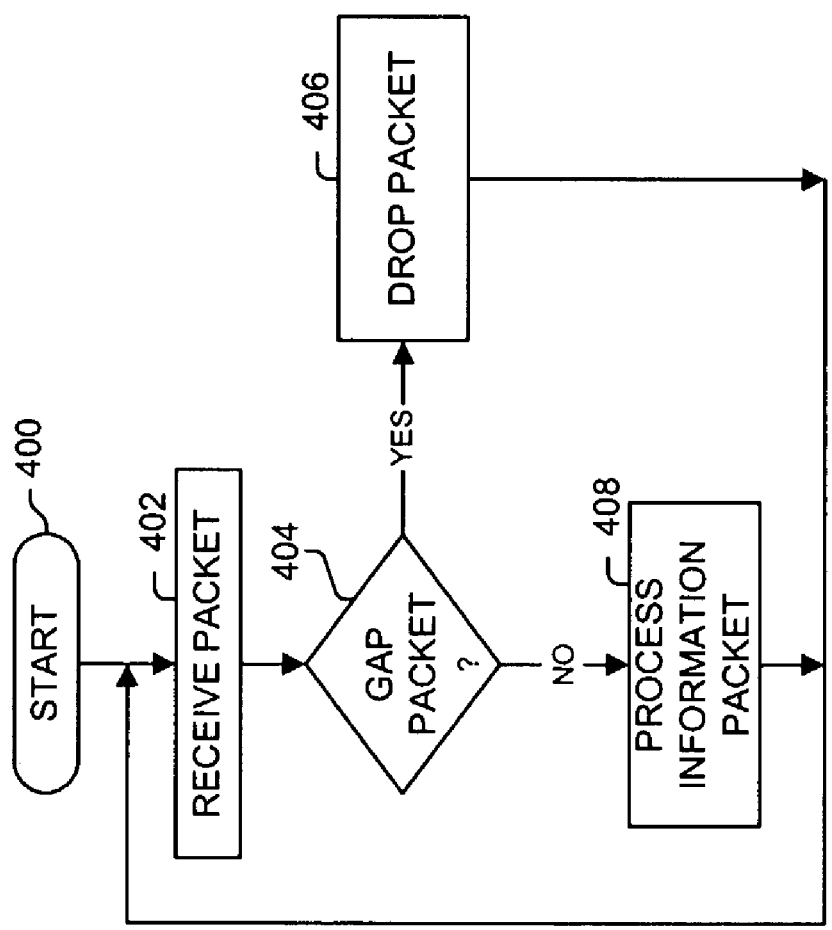
FIG. 4 is a flow diagram of a process used by a receiving device to drop the received gap packets.

FIG. 4 is a flow diagram of a process used by a receiving device to drop the received gap packets. Processing beings with process block 400, and proceeds to process block 402, wherein a packet is received. As determined in process block 404, if the packet is determined to be a gap packet (e.g., by inspecting one or more bits of the received packet), then the gap packet is dropped in process block 406. Otherwise, the information packet is processed accordingly in process block 408. Processing returns to process block 402.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method for communicating information, the method comprising:
   receiving, by a first device, non-local-destined information packets flowing through the first device in a ring network and information packets destined for the first device;
   storing, in the first device, said received non-local-destined information packets in a transit buffer configured for storing said non-local-destined information packets flowing through the first device in the ring network;
   sending a series of packets from a first device in a ring network to a second device in the ring network, the series of packets including interspersed information packets and gap packets, with said information packets including said non-local-destined information packets said stored in the transit buffer;
   wherein the first device determines when to insert said gap packets into the series of packets in order to reduce or eliminate an overflow condition in the ring network, with said determination including resulting in inserting a gap packet into the series of packets despite currently having an information packet of said information packets to send in the series of packets; and wherein said determination resulting in inserting a gap packet into the series of packets, rather than not inserting the gap packet, is responsive to identifying that the occupancy of said non-local-destined information packets said stored in the transit buffer of the first device equals or exceeds a threshold value.

2. The method of claim 1, wherein said determining when to insert one of the gap packets into the series of packets is performed in response to the expiration of a timer.

3. The method of claim 1, wherein said determining when to insert one of the gap packets into the series of packets is performed periodically after a predetermined plurality of expirations of a timer.

4. The method of claim 1, wherein said determining when to insert one of the gap packets into the series of packets is performed periodically after a predetermined plurality of packets have been sent.

5. The method of claim 1, wherein each of said gap packets are of a same size.

6. The method of claim 1, wherein at least two of said gap packets are of a different size.

7. The method of claim 1, wherein said interspersing of said information packet and said gap packets by the first device includes: selecting immediately before a link transmitter between sending a gap packet of said gap packets and an information packet of said information packets.

8. The method of claim 7, wherein said selecting of sending the information packet includes selecting of the information packet that has been processed by a MAC processing stage; and wherein said selecting of sending the gap packet includes receiving the gap packet from a gap packet generator that has not been processed by a MAC processing stage; wherein said sent gap packets are not processed by a MAC processing stage in the first device nor processed by a MAC processing stage in the second device.

9. The method of claim 1, wherein said gap packets received by the second device are dropped prior to Medium Access Control (MAC) processing by the second device of received packets of the series of packets.

10. The method of claim 1, wherein the ring network is a dual ring network; wherein the method includes selectively insert gap packets onto each ring of the dual ring network.

11. An apparatus in a ring network for communicating information to a second apparatus in the ring network, the apparatus comprising:
- a transit buffer configured for storing non-local-destined information packets, received on a link receiver from an external source in the ring network, and flowing through the apparatus in the ring network;
- control logic configured for determining, and for generating an indication of the result of said determination, whether to send one of said information packets stored in the transit buffer, a locally generated information packet, or a gap packet to be immediately dropped by the second apparatus in order to reduce or eliminate an overflow condition in the ring network, with said determination including resulting in inserting the gap packet, rather than not inserting the gap packet, despite currently having an information packet to send, is responsive identifying that the occupancy of said non-local-destined information packets stored in the transit buffer equals or exceeds a threshold value;
- one or more selection mechanisms, communicatively coupled to the to the transit buffer and said control logic, configured for selecting, based on said indication, to send to the second apparatus in the network; (1) said one of said information packets stored in the transit buffer, (2) the locally generated information packet, or (3) the gap packet; and
- a link transmitter directly coupled to at least one of said one or more selection mechanisms configured for transmitting said selected packet to the second apparatus in the ring network.

12. The apparatus of claim 11, including a timing mechanism for generating an expired indication; wherein said control logic, in response to said expired indication, determines whether to insert one of the gap packets.

13. The apparatus of claim 11, including: a link receiver configured to receive packets; MAC processing logic configured to perform MAC processing of non-gap packets; and gap packet identification logic, directly coupled to the link receiver, configured to drop received gap packets, wherein said apparatus is configured to drop said gap packets prior to said MAC processing logic.

14. The apparatus of claim 13, wherein the apparatus is configured to perform Medium Access Control (MAC) processing of said non-local-destined information packets removed from the transit buffer.

15. The apparatus of claim 11, wherein said selected packet is communicated between said one or more selection mechanisms and the link transmitter without any buffering of the selected packet.

16. The apparatus of claim 15, comprising:
- means for receiving gap and information packets; wherein said means for receiving gap and information packets includes means for receiving non-local-destined information packets flowing through the apparatus in the ring network; and
- means for identifying and dropping said received gap packets immediately after receipt.

17. The apparatus of claim 11, wherein the ring network is a dual ring network; wherein the apparatus is configured selectively insert gap packets onto each ring of the dual ring network.

18. An apparatus for communicating information in a ring network, the apparatus comprising:
- means for receiving non-local-destined information packets flowing through the apparatus in the ring network and locally-destined information packets;
- a transit buffer configured for storing said received non-local-destined information packets flowing through the apparatus in the ring network; and
- means sending a series of packets from the apparatus to a second device in the ring network, with the series of packets including interspersed information packets and gap packets, with said information packets including said non-local-destined information packets said stored in the transit buffer;
- wherein said means for sending the series of packets includes means for determining when to insert, rather than not inserting, said gap packets into the series of packets in order to reduce or eliminate an overflow condition in the ring network, with said determination including resulting in inserting a gap packet into the series of packets, despite currently having an information packet of said information packets to send in the series of packets, is responsive to identifying that the occupancy of said non-local-destined information packets stored in the transit buffer equals or exceeds a threshold value.

19. The apparatus of claim 18, wherein the ring network is a dual ring network: wherein the apparatus is configured selectively insert gap packets onto each ring of the dual ring network.

* * * * *

UNITED STATES PATENT AND TRADEMARK OFFICE
CERTIFICATE OF CORRECTION

| | | |
|---|---|---|
| PATENT NO. | : 7,742,410 B1 | Page 1 of 1 |
| APPLICATION NO. | : 10/320170 | |
| DATED | : June 22, 2010 | |
| INVENTOR(S) | : Goldin et al. | |

It is certified that error appears in the above-identified patent and that said Letters Patent is hereby corrected as shown below:

Title Page, (56) References Cited: Remove irrelevant reference 5,974,997 A 11/1999 Amburgey Col. 1, line 27, replace "Protocol (1P)" with -- Protocol (IP) --

Col. 3, line 55, replace "&cable," with -- a cable, --

Col. 9, Claim 11, line 34, replace "network;" with -- network: --

Col. 10, Claim 19, line 48, replace "network:" with -- network; --

Signed and Sealed this

Twenty-first Day of September, 2010

David J. Kappos
*Director of the United States Patent and Trademark Office*